United States Patent [19]

Stuchal

[11] Patent Number: 4,463,125
[45] Date of Patent: Jul. 31, 1984

[54] N-(SUBSTITUTED OXYMETHYL)MELAMINE DERIVATIVES AS SILICA COUPLING AGENTS

[75] Inventor: Frank W. Stuchal, Bridel, Luxembourg

[73] Assignee: The Goodyear Tire & Rubber Company, Akron, Ohio

[21] Appl. No.: 409,232

[22] Filed: Aug. 18, 1982

[51] Int. Cl.$^3$ ............................................. C08K 3/36
[52] U.S. Cl. ................................. 524/566; 524/512; 524/526; 524/571; 524/573; 524/575; 523/216
[58] Field of Search ............... 524/575, 566, 512, 555, 524/100, 526, 571, 573; 523/216

[56] References Cited

U.S. PATENT DOCUMENTS

| | | | |
|---|---|---|---|
| 3,638,702 | 2/1972 | Endter | 525/138 |
| 3,992,334 | 11/1976 | Harvey | 524/512 |
| 4,038,220 | 7/1977 | Thompson | 524/512 |
| 4,339,359 | 7/1982 | Bezwada | 524/512 |

*Primary Examiner*—Herbert J. Lilling
*Attorney, Agent, or Firm*—H. C. Young, Jr.

[57] ABSTRACT

Novel rubber compounding ingredients are disclosed. The ingredients, which may be used in a wide variety of rubber compounds having siliceous fillers comprise certain N-substituted melamines which act as silica coupling agents. The melamines bind both to the siliceous filler and to the rubber network to increase the reinforcement effect of the silica. Use of the melamines of the invention reduces the cost of producing the rubber when compared to rubbers containing prior art silica coupling agents.

11 Claims, No Drawings

N-(SUBSTITUTED OXYMETHYL)MELAMINE DERIVATIVES AS SILICA COUPLING AGENTS

TECHNICAL FIELD

This invention relates to the art of rubber compounding, and in particular to silica coupling agents. The invention contemplates the use of substituted melamines which couple silica fillers to the rubber network.

BACKGROUND ART

Various silica and silicate compounds have long been used as partial or complete replacements for carbon blacks in rubber compounding recipes. Their use is accompanied by increases in certain desirable physical properties such as tear resistance, hardness, etc. which may be of particular importance in the manufacture of tires and other articles. Use of silicas and silicates, however, also results in corresponding losses in other physical properties, particularly in modulus (stiffness). This has been attributed to the fact that, unlike carbon blacks, the silica compounds in and of themselves lack the ability to bond to the rubber molecular chains. It is this bonding which gives carbon black reinforced elastomers their superior viscoelastic properties.

To overcome the bonding deficiencies of silicas and silicates, there have been developed silica coupling agents which, through interaction between the silica compound and the rubber, provide a means for bonding the silicon compound to the rubber in a manner analogous to carbon black and effectively overcoming the inherent deficienies of using non-carbon black fillers.

The present invention provides for novel silica coupling agents, viz., certain substituted melamines, which may be used in both natural and synthetic rubbers and in blends thereof. The known silica coupling agents include bis-(3-[triethoxysilyl]propyl)-tetrasulfane manufactured by the Degussa Corporation. This compound is sold under the tradename of SI-69. Other silica coupling agents are described in an article entitled "Reinforcing Silicas and Silicates", M. P. Wagner, Rubber Chemistry and Technology, Volume 49, pages 730-737.

U.S. Pat. No. 3,775,366 to Wolff, et al, relates to a process for cross-linking natural or synthetic rubber having fillers, without the use of elemental sulfur. The sulfur is replaced by triazines which improve the workability of the rubber mixtures in the plastic state and which provide improved physical properties of the cross-linked rubber. The triazines of the invention are not used as silica coupling agents.

U.S. Pat. Nos. 3,801,537 and 3,923,724 to Westlinning, et al, relate to the use of substituted sim-triazinyl disulfide compounds to modify the reinforcing effects of a filler in a rubber vulcanizate. Neither of these patents teach the use of a substituted melamine of the present invention to act as a silica coupling agent.

U.S. Pat. No. 3,517,722 to Endter, et al, relates to the use of a methylene donor in conjunction with a methylene acceptor to form a resin in situ in a rubber compound, said resin improving the adhesion of metallic wire embedded in the rubber. While this patent encompasses the use of melamines, there is no suggestion of the use of the substituted melamines as silica coupling agents. Further, the substituted melamines in Endter, used as methylene donors must be reacted with the methylene acceptors, to produce a resin which is beyond the scope of the present invention.

DISCLOSURE OF INVENTION

It is an object of the present invention to provide a rubber compounding ingredient which modifies the physical properties of rubbers containing siliceous fillers.

It is another aspect of the present invention to provide a rubber compounding ingredient, as above, which couples the siliceous filler to the rubber network.

It is yet another object of the present invention to provide a rubber compounding ingredient, as above, which is lower in cost than compounds of the prior art.

It is still another object of the present invention to provide a rubber compounding ingredient, as above, which may be used in smaller quantities than compounds of the prior art.

It is yet another object of the present invention to provide a rubber compounding ingredient, as above, which improves the modulus of the rubber.

It is still another object of the present invention to provide a rubber compounding ingredient, as above, which improves the stock tear.

Still another object of the present invention is to provide a rubber compounding ingredient, as above, which does not require modification of conventional, prior art rubber manufacturing processes.

These aspects and others which will become more apparent as the detailed description proceeds, are achieved by: a rubber compound comprising: a synthetic or natural elastomer or blend thereof; a siliceous filter; and a silica coupling agent having the structure:

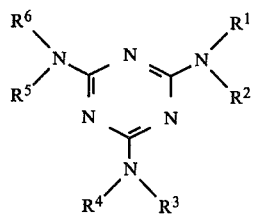

where $R^1$, $R^2$, $R^3$, $R^4$, $R^5$, and $R^6$ may be the same or different and are selected from the group consisting of:

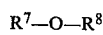

$$R^7-O-R^8$$

where $R^7$ may be an alkylene or alkenylene having from 1 or 2 respectively to 5 carbon atoms, phenylene, or an alkyl substituted phenylene having from 7 to 11 carbon atoms. $R^8$ may be an alkyl or alkenyl having from 1 or 2 respectively to 5 carbon atoms, phenyl, or an alkyl substituted phenyl having from 7 to 11 carbon atoms; wherein said silica coupling agent improves the physical properties of said rubber compound.

In general, a process for making a rubber compound, comprising: compounding a natural or synthetic elastomer or blend thereof with a siliceous filler and a silica coupling agent; and curing the rubber compound to produce an article having improved physical properties compared to the same compound not containing said silica coupling agent; wherein said silica coupling agent has the structure:

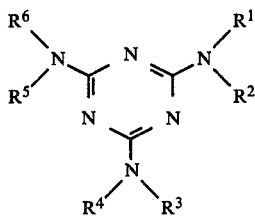

where $R^1$, $R^2$, $R^3$, $R^4$, $R^5$ and $R^6$ may be the same or different and are selected from the group consisting of:

$$R^7-O-R^8$$

where $R^7$ may be an alkylene or alkenylene having from 1 or 2 respectively to 5 carbon atoms, phenylene, or an alkyl substituted phenylene having from 7 to 11 carbon atoms. $R^8$ may be an alkyl or alkenyl having from 1 to 2 respectively to 5 carbon atoms, phenyl, or an alkyl substituted phenyl having from 7 to 11 carbon atoms; wherein said silica coupling agent improves the physical properties of said rubber compound.

BEST MODE FOR CARRYING OUT THE INVENTION

Silica coupling agents in general comprise a class of compounds used to improve the physical properties of rubber having siliceous fillers which partially or completely replace carbon black. Substitution of the siliceous fillers may result in lower material cost and/or in improvements in certain physical properties of the rubber. However, the use of these fillers generally reduces the modulus, increases heat build-up (hysteresis) and compression set and reduces abrasion resistance when compared to identical recipes utilizing carbon black. Use of silica coupling agents however, improve the physical properties to an extent such that they approach those of compounds utilizing carbon black fillers.

The silica coupling agents of the invention have the structure

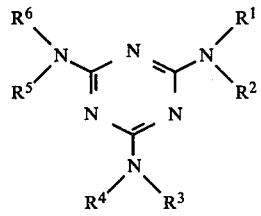

where $R^1$, $R^2$, $R^3$, $R^4$, $R^5$ and $R^6$ may be the same or different and are selected from the group consisting of $$R^7-O-R^8$$

where $R^7$ may be an alkylene or alkenylene having from 1 to 5 carbon atoms, phenylene, or an alkyl substituted phenylene having from 7 to 11 carbon atoms. $R^8$ may be alkyl or alkenyl having from 1 to 5 carbon atoms, phenyl, an alkyl substituted phenyl having from 7 to 11 carbon atoms, or $R^8$ may be —H for as many as four out of six of the group $R^1$ through $R^6$. When $R^8$ is —H for two or more groups, it is preferable that no two such groups be located pendant from the same nitrogen atom, that is, it is preferred to have those $R^1$ through $R^6$ groups having $R^8$ not being —H as evenly distributed as possible about the 3 melamine nitrogens. For example, if $R^8$ is —H for four groups, the other two groups are preferably on different nitrogen atoms.

A preferred compound is hexamethoxymethylmelamine, in which $R^7$ is methylene and $R^8$ is methyl for $R^1$ and $R^6$.

Other preferred compounds include commercially available methoxymethylated melamines such as pentamethoxymethylmelamine sold under the trade name Cohedur A by Bayer. Hexamethoxymethylmelamine is available from American Cyanamide. The melamines of the invention may also be prepared by well known laboratory techniques.

The mechanism by which the N-substituted melamines of the invention operate to improve the physical properties of the rubber is not completely understood, but it is believed that reactions occur between the siliceous compound, for example, SiOH, and the pendant groups of the melamine such that a linkage is formed. The remaining pendant groups which have not reacted with the siliceous filler bind to the rubber, most probably by a reaction with the sulfur or other vulcanizing agent during rubber cure. Thus, improvements are observed in the physical properties of the rubber after the curing step. The method of rubber compounding, except for the addition of the silica coupling agent of the invention, is conventional, as is the curing step.

The types of rubbers in which the substituted melamines can be used as silica coupling agents, include natural rubber and most synthetic rubbers, such as cis-1,4 polyisoprene, conjugated diene polymeric rubbers made by polymerizing 1,3-butadiene, isoprene, 2,3-dimethyl-1,3-butadiene and mixtures of these conjugated dienes as well as copolymers of these diene monomers with compounds containing polar groups such as vinyl, phenyl, nitrile and carboxy radicals. Examples of diene rubbers are polybutadiene, stereospecific polybutadienes, stereospecific polyisoprenes, butadiene/styrene copolymers, also known as SBR, and butadiene/acrylonitrile copolymers, also known as NBR.

The amounts of the N-substituted melamines used in rubber compounds may vary from about 0.5 to 3 parts by weight per hundred parts by weight of rubber (phr) for every 10 phr of siliceous filler, with from about 0.7 to 1.5 phr per 10 phr siliceous filler being preferred. As used in the specification, phr refers to parts by weight per hundred parts by weight of rubber.

Generally, the rubbers produced utilizing the N-substituted melamines of this invention are useful in applications such as tread stock and wire skim stock for tires such as truck tires, automobile tires and earth moving tires, and other uses such as conveyor belts, hoses, V-belts, and other general industrial rubber products. The improvements realized with the use of the silica coupling agent depend in part upon the particular rubber compound recipe used and the application. Table I gives the base formulation which has been used to compare the physical properties of rubbers utilizing hexamethoxymethylmelamine (HMMM) with control rubber compounds having siliceous fillers but no silica coupling agents. Table I also notes the experimental mixing and curing details. Table II lists the test used to determine physical properties along with the units of measurements.

Table III illustrates the reinforcing nature of silica containing stocks in the presence of HMMM. The addition of silica alone to the base formulation does not significantly affect strength properties as evidenced by only slight changes in 300% modulus and maximum rheometer torque ($M_{HF}$). A very significant increase in these properties is observed when hexamethoxymethylmelamine is used in conjunction with silica. Dynamic modulus increases for silica only stocks as silica level increases, but not to the extent that dynamic modulus increases for silica plus HMMM containing stocks. (The increase in dynamic modulus for silica only stocks can be attributed to the hydrodynamic effect of the silica). A similar situation is observed for tan δ and rebound. Increasing silica increases tan δ (reduces rebound). In the presence of HMMM tan δ increases (rebound decreases) as silica increases but not to the same extent. Shore A hardness increases with increasing silica concentration but not to the same extent as in the presence of HMMM. (Compare compounds B through F versus G through K). A similar situation is also observed for tear values. In the presence of increasing silica, tear decreases. Use of HMMM results in tear values well above those observed for silica alone. These results clearly indicate that hexamethoxymethylmelamine provides a reinforcement effect when used in conjunction with silica.

Table VI demonstrates the ability of hexamethoxymethylmelamine to provide increased reinforcement to silica containing stocks relative to other commercially available silane coupling agnets. Hexamethoxymethylmelamine was compared to three silane coupling agents—triethoxymethyl, triethyoxyvinyl, and triethoxy silane in the base formulation given in Table I with the exception that *no* carbon black was added. This was done to enhance any observation of reinforcement due to the action of the coupling agent without being masked by the high reinforcement of the carbon black. All properties for the silane containing compounds are similar whereas the compound containing hexamethoxymethylmelamine shows significantly increased maximum rheometer torque, 300% modulus, tensile, hardness, rebound and dynamic modulus. Elongation and tangent δ are decreased. These results are consistent with those observed in Table III and clearly show the ability of hexmethoxymethylmelamine to promote reinforcement of siliceous fillers in rubber compounds relative to their silane counterparts.

TABLE I

| BASE FORMULATION | |
| --- | --- |
| Natural Rubber SMR 10 | 100 |
| Stearic Acid | 2 |
| ZnO | 5 |
| Carbon Black | 45 |
| Silica | Variable |
| Antioxidant | 3.12 |
| Cymic | Variable |
| Sulfur | 2.25 |
| Benzothiazole disulfide | 1.00 |

All compounds were mixed in a 3 liter Banbury in two stages. The first stage contained all the ingredients with the exception of the sulfur and accelerator which were added in the second stage. All compounds were cured to their $T_g\%$ at 149° C. including appropriate mold lag corrections where necessary.

TABLE II

| TESTS METHODS AND UNITS OF MEASUREMENTS |
| --- |
| Monsanto Rheometer ASTM D2084 |
| $M_L$ Minimum Torque (Newton · meters — N · m) |
| $M_{HF}$ Maximum Torque (Newton · meters — N· m) |
| Stress/Strain ASTM D412 |
| Tensile (Megapascal-MPa) Ultimate Strength |
| 300% Modulus (MPa) Tensile at 300% Elongation |
| Elongation at Break (%) |
| Shore A Hardness ASTM D2240 |
| Rebound Resilience ASTM D1054(%) |
| Crescent Tear ASTM D624 (kilonewtons/meter-kN/m) |
| Dynamic Viscoelastic Properties not ASTM* |
| Dynamic Modulus (Megapascals-MPa) |
| Tan δ (Dimensionless) |

*Sebreel, L. G. and Dinsmore, R. P., India Rubber World, 104, 45, (1941). Gehman, S. D., Woodford, D. E., and Stambaugh, R. B., Ind. Eng. Chem., 33, 1032 (1941).

TABLE III

PHYSICAL PROPERTIES OF SILICA AND SILICA/HMMM CONTAINING COMPOUNDS

| | A | B | C | D | E | F | G | H | I | J | K |
| --- | --- | --- | --- | --- | --- | --- | --- | --- | --- | --- | --- |
| Base Formulation phr | 158.37 | | | | | | | | | | |
| Silica | 0 | 10 | 20 | 30 | 40 | 45 | 10 | 20 | 30 | 40 | 45 |
| HMMM phr | 0 | 0 | 0 | 0 | 0 | 0 | 1 | 2 | 3 | 4 | 5 |
| Monsanto Rheometer at 149° C. | | | | | | | | | | | |
| $M_L$ (N · M) | 1.24 | 1.40 | 1.55 | 1.78 | 2.65 | 2.80 | 1.41 | 1.60 | 1.97 | 1.98 | 2.23 |
| $M_{HF}$ (N · M) | 3.94 | 3.91 | 3.73 | 3.80 | 4.92 | 5.12 | 4.49 | 5.38 | 5.52 | 5.78 | 6.82 |
| Stress/Strain | | | | | | | | | | | |
| 300% Modulus (MPa) | 10.2 | 10.4 | 10.0 | 9.8 | 10.6 | 10.0 | 12.3 | 14.7 | 14.8 | 15.8 | 16.4 |
| Tensile (MPa) | 27.5 | 23.0 | 20.5 | 17.0 | 13.5 | 12.5 | 25.6 | 22.7 | 23.0 | 20.2 | 18.6 |
| Elongation (%) | 570 | 520 | 490 | 455 | 370 | 360 | 510 | 450 | 470 | 405 | 360 |
| Shore A Hardness | 60 | 58 | 58 | 64 | 72 | 80 | 65 | 71 | 74 | 78 | 82 |
| Rebound (%) | 67 | 63 | 58 | 55 | too hard | | 65 | 61.5 | | too hard | |
| Crescent Tear (kN/m) | 61 | 52 | 65 | 57 | 51 | 47 | 72 | 67 | 76 | 68 | 58 |
| Viscoelastic Properties | | | | | | | | | | | |
| DynMod (MPa) | 6.4 | 7.0 | 6.9 | 8.5 | 12.5 | 14.1 | 7.9 | 11.2 | 12.2 | 16.5 | too hard |
| tan δ | 0.14 | 0.14 | 0.14 | 0.19 | 0.22 | 0.23 | 0.11 | 0.13 | 0.15 | 0.20 | |

TABLE IV

PHYSICAL PROPERTIES OF HEXAMETHOXYMETHYL-MELAMINE VS CONVENTIONAL COUPLING AGENTS

| | L | M | N | O |
| --- | --- | --- | --- | --- |
| Base Formulation* | 113.37 | | | |
| Silica (phr) | 22.0 | | | |
| Triethoxymethyl Silane (phr) | 2 | | | |
| Triethoxyvinyl Silane (phr) | | 2 | | |
| Triethoxy Silane (phr) | | | 2 | |
| Hexamethoxymethylmelamine (phr) | | | | 2 |
| Monsanto Rheometer at 149 ° C. | | | | |
| $M_L$ (N · m) | 0.7 | 0.7 | 0.8 | 0.7 |
| $M_{HF}$ (N · m) | 2.1 | 2.2 | 2.1 | 2.7 |
| Stress/Strain | | | | |
| 300% Modulus (MPa) | 1.4 | 1.7 | 1.7 | 4.0 |
| Tensile (MPa) | 18 | 19 | 20 | 24 |
| Elongation (%) | 730 | 710 | 740 | 640 |
| Shore A Hardness | 40 | 40 | 40 | 46 |

TABLE IV-continued

PHYSICAL PROPERTIES OF HEXAMETHOXYMETHYL-
MELAMINE VS CONVENTIONAL COUPLING AGENTS

|  | L | M | N | O |
|---|---|---|---|---|
| Rebound (%) | | | | |
| Room Temperature | 83 | 83 | 83 | 87 |
| 212° C. | 90 | 90 | 90 | 93 |
| Viscoelastic Properties | | | | |
| Dyn. Modulus (MPa) | 2.7 | 2.4 | 2.4 | 3.1 |
| tan δ | 0.6 | 0.5 | 0.7 | 0.4 |

*Base formulation without carbon black

While in accordance with the Patent Statutes, only the best mode and preferred embodiment have been disclosed, it is to be understood that the invention is not limited thereto or thereby. Therefore, for a fuller understanding of the scope of the invention, reference should be made to the following appended claims.

What is claimed is:

1. A rubber compound containing a reinforced siliceous filler, consisting essentially of:
 a synthetic or natural elastomer or blend thereof;
 the siliceous filler; and
 a silica coupling agent having the structure:

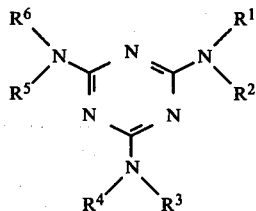

where $R^1$, $R^2$, $R^3$, $R^4$, $R^5$ and $R^6$ may be the same or different and are selected from the group consisting of:

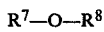
$R^7$—O—$R^8$ where $R^7$ may be an alkylene or alkenylene having from 1 or 2 respectively to 5 carbon atoms, phenylene, or an alkyl substituted phenylene having from 7 to 11 carbon atoms, $R^8$ may be an alkyl or alkenyl having from 1 to 2 respectively to 5 carbon atoms, phenyl, or an alkyl substituted phenyl having from 7 to 11 carbon atoms; said silica coupling agent is present in an amount from about 0.5 to 3 phr per 10 of said siliceous filler,
wherein said silica coupling agent promotes reinforcement of said siliceous filler and the 300% modulus of said rubber compound.

2. A rubber compound according to claim 1, wherein said silica coupling agent is compounded with said siliceous filler and said elastomer.

3. A rubber compound according to claim 2, wherein said elastomer is selected from the group consisting of natural cis-1, 4 polyisoprene, conjugated diene polymeric rubbers made by polymerizing 1,3-butadiene, isoprene, 2,3-dimethyl 1,3-butadiene, and mixtures thereof, and copolymers of diene monomers with compounds containing a vinyl, phenyl, nitrile or carboxy radical.

4. A rubber compound according to claim 3, wherein said silica coupling agent is hexamethoxymethylmelamine.

5. A rubber compound according to claim 4, wherein said hexamethoxymethylmelamine is present in said compound in an amount of from about 0.7 to about 1.5 phr per 10 phr siliceous filler.

6. A rubber compound according to claims 1, 2, 3, or 4 wherein said rubber compound is used in a tire or industrial rubber products.

7. A process for making a rubber compound containing a reinforced siliceous filler, consisting essentially of:
 compounding a natural or synthetic elastomer or blend thereof with the siliceous filler and a silica coupling agent; and
 curing the rubber compound to produce an article having improved physical properties compared to the same compound not containing said silica coupling agent;
wherein said silica coupling agent has the structure;

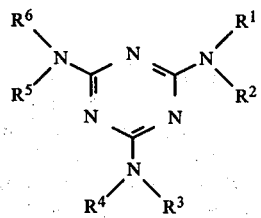

where $R^1$, $R^2$, $R^3$, $R^4$, $R^5$, and $R^6$ may be the same or different and are selected from the group consisting of:

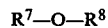
$R^7$—O—$R^8$ where $R^7$ may be alkylene or alkenylene having from 1 or 2 respectively to 5 carbon atoms, phenylene, or an alkyl substituted phenylene having from 7 to 11 carbon atoms, $R^8$ may be an alkyl or alkenyl having from 1 or 2 respectively to 5 carbon atoms, phenyl, or an alkyl substituted phenyl having from 7 to 11 carbon atoms; said silica coupling agent is present in said compound in an amount of from about 0.5 to about 3.0 phr per 10 phr of said siliceous filler, and
wherein said silica coupling agent promotes reinforcement of said siliceous filler and improves the modulus of said rubber compound.

8. A process according to claim 7, wherein said elastomer is selected from the group consisting of natural cis-1, 4 polyisoprene, conjugated diene polymeric rubbers made by polymerizing 1,3-butadiene, isoprene, 2,3-dimethyl, 1,3-butadiene, and mixtures thereof, and copolymers of diene monomers with compounds containing a vinyl, phenyl, nitrile or carboxy radical.

9. A process according to claim 8, wherein said silica coupling agent is hexamethoxymethylmelamine.

10. A process according to claim 9, wherein said hexamethoxymethylmelamine is present in said compound in an amount of from about 0.7 to about 1.5 phr per 10 phr siliceous filler.

11. A process according to claims 5 7, 8, 9 or 10, wherein said rubber compound is used as tread stock in a tire.

* * * * *